United States Patent [19]

Fan et al.

[11] Patent Number: 4,599,390

[45] Date of Patent: Jul. 8, 1986

[54] HIGH MOLECULAR WEIGHT WATER-SOLUBLE POLYMERS AND FLOCCULATION METHOD USING SAME

[75] Inventors: You-Ling Fan, East Brunswick; George L. Brode, Somerville, both of N.J.; Meyer R. Rosen, Spring Valley, N.Y.

[73] Assignee: Union Carbide Corporation, Danbury, Conn.

[21] Appl. No.: 777,458

[22] Filed: Sep. 18, 1985

Related U.S. Application Data

[63] Continuation-in-part of Ser. No. 474,602, Mar. 11, 1983, abandoned, which is a continuation-in-part of Ser. No. 302,110, Sep. 14, 1981, abandoned.

[51] Int. Cl.$^4$ ............................................. C08F 30/04
[52] U.S. Cl. ..................................... 526/240; 526/287
[58] Field of Search ................................. 526/240, 287

[56] References Cited

U.S. PATENT DOCUMENTS

| | | | |
|---|---|---|---|
| 3,479,282 | 11/1969 | Chamot et al. | 210/54 |
| 3,479,284 | 11/1969 | Lees | 210/734 |
| 3,692,673 | 9/1972 | Hoke | 210/734 |
| 3,709,815 | 1/1973 | Boothe et al. | 210/58 |
| 3,709,816 | 1/1973 | Walker et al. | 210/58 |
| 3,790,476 | 2/1974 | Spoerle et al. | 210/47 |
| 3,790,477 | 2/1974 | Nielsen et al. | 210/47 |
| 3,806,367 | 4/1974 | Lange et al. | 134/3 |
| 3,898,037 | 8/1975 | Lange et al. | 210/701 |
| 3,975,496 | 8/1976 | Smalley et al. | 423/122 |
| 4,024,040 | 5/1977 | Phalangas et al. | 204/159 |
| 4,075,183 | 2/1978 | Kawakami et al. | 526/287 |
| 4,266,044 | 5/1981 | Timmerman et al. | 526/287 |
| 4,296,016 | 10/1981 | Randin | 526/287 |
| 4,309,523 | 1/1982 | Engelhardt et al. | 526/240 |
| 4,342,653 | 8/1982 | Halverson | 210/912 |
| 4,452,940 | 6/1984 | Rosen | 524/801 |
| 4,529,782 | 7/1985 | Fan et al. | 526/259 |

FOREIGN PATENT DOCUMENTS

| | | | |
|---|---|---|---|
| 1442408 | 11/1968 | Fed. Rep. of Germany . | |
| 2543135 | 10/1976 | Fed. Rep. of Germany . | |
| 51-18913 | 6/1976 | Japan . | |
| 52-37589 | 3/1977 | Japan . | |
| 53-55488 | 5/1978 | Japan . | |
| 54-61285 | 5/1979 | Japan . | |
| 997922 | 7/1965 | United Kingdom | 526/209 |
| 1401353 | 7/1975 | United Kingdom . | |
| 1437281 | 5/1976 | United Kingdom . | |
| 2093464 | 9/1982 | United Kingdom | 526/240 |

*Primary Examiner*—Joseph L. Schofer
*Assistant Examiner*—N. Sarofim
*Attorney, Agent, or Firm*—Henry H. Gibson

[57] ABSTRACT

A high molecular weight, water-soluble polymer, water-in-oil emulsions thereof and a flocculating process using same are disclosed. The polymer may be represented by the formula:

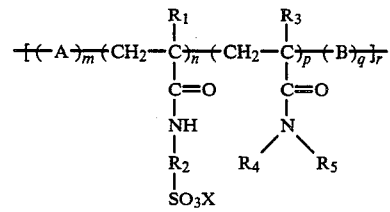

wherein A represents a repeating unit derived from a hydrophobic vinyl monomer having a water-solubility of less than about 5 weight %; $R_1$ and $R_3$ are each hydrogen atom or a methyl group; $R_4$ and $R_5$ are each a hydrogen atom, a methyl group or an ethyl group; $R_2$ represents a divalent hydrocarbon group having from 2 to 13 carbon atoms; X represents a monovalent cation; B represents a repeating unit derived from an ethylenically-unsaturated carboxylic acid or a salt thereof; m is about 0.1–10 mole %, n is about 1–40 mole %, p is about 20–98.9 mole %, and q is about 0–40 mole % with the proviso that m+n+p+q=100 mole % and r is a large positive integer.

21 Claims, 7 Drawing Figures

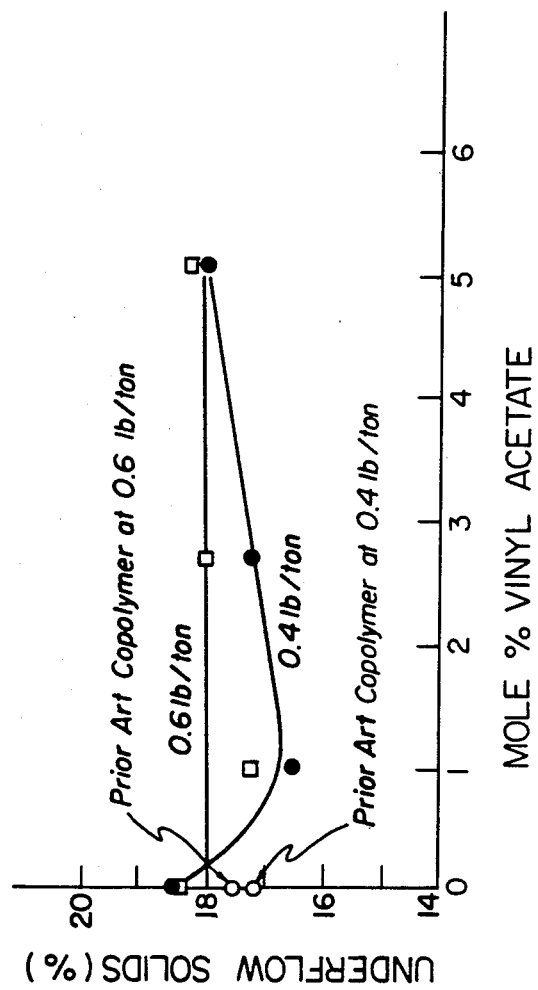

HIGH MOLECULAR WEIGHT WATER-SOLUBLE POLYMERS AND FLOCCULATION METHOD USING SAME

CROSS-REFERENCE TO RELATED APPLICATION

This application is a continuation-in-part of U.S. patent application Ser. No. 474,602, filed Mar. 11, 1983, now abandoned, which is a continuation in-part of copending U.S. patent application Ser. No. 302,110, filed Sept. 14, 1981, now abandoned and refiled Nov. 17, 1983 as U.S. patent application Ser. No. 552, 735, now issued as U.S. Pat. No. 4,529,782.

BACKGROUND OF THE INVENTION

1. Field of the Invention

This invention relates to water-soluble acrylamide containing polymers and their use in, for example, flocculation of waste mineral processing streams.

2. Description of Background Information

In a number of mining industries such as copper, iron (taconite), potash, phosphate, coal, etc., waste products from the ore processing present serious disposal problems. For example, in the phosphate mining industry, processing leads to about one-third recoverable phosphate rock, about one-third sand tailings and about one-third fines of generally less than 150 mesh particle size. Aqueous suspensions of these ultrafine solids, which are associated with the ore, and which result from the processing, are referred to as "slimes." In the central area of the State of Florida, where a large portion of the U.S. phosphate mining industry exists, the problem of disposal of these slimes has become a major problem. The slimes may be contained in ponds or impounded areas surrounded by earthen dams and allowed to settle by gravity. However, this process takes a number of years. Alternatively, flocculants may be employed to concentrate the suspended solids.

Similarly, in the coal mining industry, large amounts of so-called "blackwater" are generated as a waste product of the coal cleaning plant operations. Such blackwater contains suspended coal fines and clays which desirably are removed prior to disposal or reuse of the water.

Mineral slimes exhibit colloid-like properties that are believed to be largely responsible for their poor dewatering characteristics and generally comprise very fine colloid-like particles (e.g., clays) suspended in water which, in the case of phosphate slimes, are largely Montmorillonite and Attapulgite clays. Attapulgite and Montmorillonite clays together are known to comprise approximately one-third of a typical phosphate slime. These clay materials are also well known for their colloid-like behavior when exposed to water. They tend to absorb water or to associate with water and form a suspended material which may be difficult to flocculate.

Water-soluble acrylamide polymers and copolymers are known as being useful for the flocculation of such phosphate slimes and blackwater suspensions. For example, commonly-assigned,, U.S. Pat. No. 4,529,782 (the disclosure of which is hereby expressly incorporated herein by reference), describes acrylamide-containing polymers, having an inrinsic viscosity of at least 15 dl/g, useful for flocculating phosphate slimes. The disclosed polymers may be terpolymers which may be represented by the following formula:

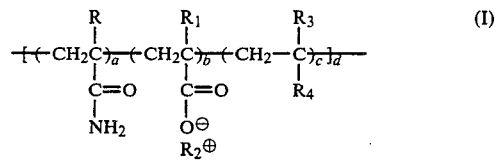

wherein:

R, $R_1$ and $R_3$ are independently hydrogen or methyl;
$R_2{}^+$ is an alkali metal ion, such as $Na^+$ or $K^+$;
$R_4$ is (1) $OR_5$ where $R_5$ is an alkyl group having up to 5 carbon atoms; (2)

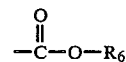

where $R_6$ is an alkyl group having up to 8 carbon atoms; (3)

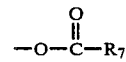

where $R_7$ is methyl, ethyl or butyl; (4) phenyl; (5) substituted phenyl; (6) CN; or (7)

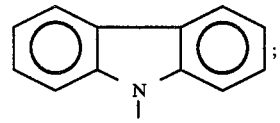

a is from about 5 to about 90 mole percent;
b is from 5 to about 90 mole percent;
c is from about 0.2 to about 20 mole percent; and
d is an integer of from about 100,000 to about 500,000.

An example of such a terpolymer is one derived from a monomer mixture comprising about 54.3 mole percent acrylamide, about 4.6 mole % vinyl acetate and about 41.1 mole % sodium acrylate.

Also disclosed in said U.S. Pat. No. 4,529,782, are tetrapolymers obtained by the partial hydrolysis of the $R_4$ group in the above formula.

A process for flocculating phosphate slimes employing such polymers is disclosed in commonly-assigned U.S. Pat. No. 4,452,940, the disclosure of which is hereby expressly incorporated herein by reference. The disclosed process generally comprises mixing a dilute aqueous solution of the polymer with the phosphate slimes under appropriate floc-forming conditions and allowing the suspended solids to settle from the slime to form an underflow of a more concentrated suspension of the clay solids and an essentially clear aqueous supernatant liquid.

Japanese Patent Publication No. 51-18913 describes a method of accelerating the aggregation/filtration of a fine mineral particle suspension using water-soluble terpolymers. These polymers are described as having a molecular weight above 1,000,000, preferably above 3,000,000, and comprise 5-50 weight % of a univalent salt of acrylic or methacrylic acid, 40-90 weight % of acrylamide, methacrylamide or methylol derivatives thereof, and 1-50 weight % of a weakly hydrophilic vinyl monomer. Table 1 therein describes a terpolymer prepared from 25 weight % sodium acrylate, 55 weight % acrylamide and 20 weight % vinyl acetate having a molecular weight of 1,500,000. German Offenlegungsschrift No. 2,543,135 discloses similar polymers as flocculants.

Copolymers of about 75 weight % acrylamide and about 25 weight % sodium acrylate are also known to be useful as flocculants in various aqueous systems. U.S. Pat. Nos. 3,790,476, 3,790,477, 3,479,282 and 3,479,284 disclose similar acrylamide-sodium acrylate copolymers and state that they are useful as flocculants.

U.S. Pat. No. 4,342,653 discloses a process for flocculating aqueous solid dispersions, such as phosphate slimes, with polymeric anionic flocculants comprising 40-99 mole % of repeating units derived from acrylamide, 1-35 mole % of repeating units derived from 2-acrylamido-2-methylpropane sulfonic acid (which is available from the Lubrizol Corporation under its tradename, and hereinafter referred to as, "AMPS") and 0-25 mole % of repeating units derived from acrylic acid.

U.S. Pat. No. 3,692,673 discloses water-soluble sulfonate polymers said to be useful as flocculants for aqueous systems, especially in combination with inorganic co-flocculants. The polymers contain units of the formula:

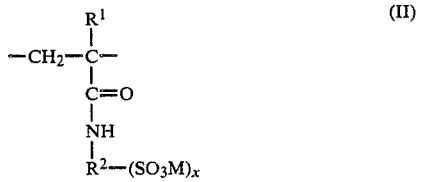

wherein $R^1$ is hydrogen or lower alkyl which may be substituted; $R^2$ is a divalent or trivalent hydrocarbon or substituted hydrocarbon radical; M is a hydrogen atom or one equivalent of a cation; and x is 1 to 2. The polymers may be obtained by polymerizing,, either alone or in combination with other polymerizable vinyl monomers, a corresponding monomeric N-sulfohydrocarbon-substituted acrylamide (e.g. "AMPS" or its alkali metal or ammonium salt). It is further disclosed that the most useful polymers are homopolymers of such monomers and copolymers thereof with 5-95 weight % of an acrylic monomer such as acrylic or methacrylic acid or a salt or amide thereof (e.g., acrylamide). Specific disclosed copolymers are 80 weight % sodium "AMPS"/20 weight % sodium acrylate and 95 weight % sodium "AMPS"/5 weight % acrylamide.

U.S. Pat. No. 3,709,815 discloses copolymers of "AMPS" with acrylamide or acrylic acid as flocculants for aqueous systems. U.S. Pat. No. 3,709,816 discloses flocculating alluvial deposits (e.g., silt) in water systems with "AMPS" or sodium "AMPS" water-soluble polymers, which may be "AMPS" homopolymers or "AMPS" copolymers (containing at least 2 mole % "AMPS") with other comonomers, preferably acrylamide, acrylic acid, vinyl acetate, methyl acrylate or styrene. Other water-soluble monoethylenically unsaturated monomers which may be used include the alkali metal salts of acrylic and methacrylic acids, etc.

U.S. Pat. No. 3,975,496 discloses water-soluble copolymers useful as flocculants, especially in settling red mud obtained by the digestion of bauxite. The copolymers are, for example, acrylamide copolymers with either "AMPS" or sodium acrylate wherein the acrylamide is partially methylolated.

Conversely, U.S. Pat. Nos. 3,898,037 and 3,806,367 disclose acrylamide-sulfonic acid copolymers useful as dispersants or deflocculants for particles in aqueous systems. The copolymers (which have a molecular weight of 750 to 5,000,000) may comprise "AMPS" (or a salt thereof) copolymerized with a vinyl monomer, such as acrylic acid, esters thereof, acrylamide, vinyl acetate, etc.

Japanese Patent Publication No. 53-55488 discloses a flocculant comprising a water-soluble polymer containing about 90-99.8 mole % of an amide-type vinyl unit (e.g., acrylamide), about 0.1-5 mole % of a sulfonic group—containing vinyl unit (e.g., "AMPS" or its salt) and 0.1-5 mole % of a carboxyl group—containing vinyl unit (e.g., acrylic acid or its salt). The disclosed polymer is said to be useful for the sedimentation of used and waste water, for concentration, and for dehydration of various types of dirt.

Japanese Patent Publication No. 52-37580 discloses a method of aggregating solids suspended in aqueous media employing an aggregating agent which comprises a copolymer which exhibits a strong tendency to form threads and which is obtained by polymerizing a mixture of 65-98 weight % of acrylamide and 2-35 weight % "AMPS", where the total monomer concentration in the mixture is at least 15 weight %.

Japanese Patent Publication No. 54-61285 discloses a method for preparing a polymeric aggregating agent wherein the wet polymer is heated at a temperature above the copolymerization temperature and then dehydrated and dried. The polymer is a copolymer containing 55-98 weight % of acrylamide and 2-45 weight % "AMPS" (or its salt) and optionally, up to 20 weight % of a third copolymerizable monomer (e.g., sodium acrylate).

British Pat. No. 1,437,281 discloses high molecular weight, water-soluble acrylamide polymers useful as flocculating agents for, e.g., mineral processing slimes. The polymer comprises at least 50 weight % of acrylamide, 0-50 weight % of acrylic acid or its alkali metal salt and up to 5 weight % of other ethylenically unsaturated monomers such as "AMPS" or its alkali metal salts.

British Pat. No. 1,401,353 discloses the use of "AMPS"—containing polymers as retention and drainage aids in paper manufacturing. The polymer contains at least 2.5 mole % "AMPS" (or its salt) and 0-97.5 mole % of a comonomer such as acrylamide or sodium acrylate and, optionally, up to 20 mole % of other water-soluble comonomers and up to 10 mole % of water-soluble comonomers.

U.S. Pat. No. 4,024,040 discloses a radiation process for preparing water-soluble, high molecular weight acrylamide polymers useful as flocculating agents. The polymer is prepared from an acrylamide-type monomer, or mixtures thereof, which monomer may be acrylamide, an alkali metal acrylate, 2-acrylamido-2-methyl-propane-sulfonic acid ("AMPS") or its salt, etc. No specific "AMPS"—containing polymers are disclosed.

West German Published (Non-Prosecuted) Application No. 1,442,408 discloses a flocculating agent comprising a copolymer of acrylamide and 1 to 10 % of compounds of the formula:

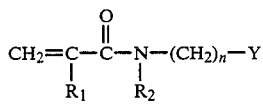

wherein $R_1$ is hydrogen or methyl, $R_2$ is hydrogen or $C_{1-4}$ alkyl, Y is $SO_3X$ or $O-13\ SO_3X$, X is a monovalent cation such an alkali metal, and n is a whole number such as 2 or 3.

It has now been found that improved flocculation efficiency is obtained in aqueous systems such as phosphate slimes and coal blackwater when the water-soluble acrylamide polymers of the present invention are used as flocculants.

SUMMARY OF THE INVENTION

Broadly stated, the present invention comprises water-soluble acrylamide-containing polymers, water-in-oil emulsions of such polymers and the use of such polymers in flocculating aqueous solid suspensions such as phosphate slimes and blackwater derived from coal washing. The polymers of the invention may be represented by the following formula:

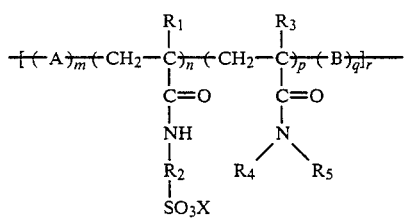

wherein A represents a repeating unit derived from a hydrophobic vinyl monomer having a water-solubility of less than about 5 weight %; $R_1$ and $R_3$ are each a hydrogen atom or a methyl group; $R_4$ and $R_5$ are each a hydrogen atom, a methyl group or an ethyl group; $R_2$ represents a divalent hydrocarbon group having from 2 to 13 carbon atoms; X represents a monovalent cation; B represents a repeating unit derived from an ethylenically-unsaturated carboxylic acid or a salt thereof; m is about 0.1–10 mole %, n is about 1–40 mole %, p is about 20–98.9 mole %, and q is about 0–40 mole %, with the proviso that $m+n+p+q=100$ mole %; and r is a large positive integer. Alternatively, the polymer may be defined as that resulting from the polymerization of a water-in-oil monomer emulsion containing monomers corresponding to the repeating units in the above formula in amounts of about 0.1–20 mole % of monomer "A", about 1–40 mole % of the $SO_3X$-containing monomer, about 20–98.9 mole % of monomer

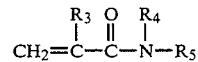

and about 0–40 mole % of monomer "B", all based on the total moles of monomer in the emulsion.

The present invention also resides in a process for flocculating an aqueous solid suspension which comprises mixing the suspension with the above-identified polymer under appropriate floc-forming conditions and allowing the suspended solids to settle to form an underflow of a more concentrated suspension of the solids and an essentially clear aqueous supernatant liquid.

BRIEF DESCRIPTION OF THE DRAWINGS

FIG. 7 shows the effect of the content of vinyl acetate, in various polymers, on flocculation efficiency.

DESCRIPTION OF THE PREFERRED EMBODIMENTS

Figure 1:
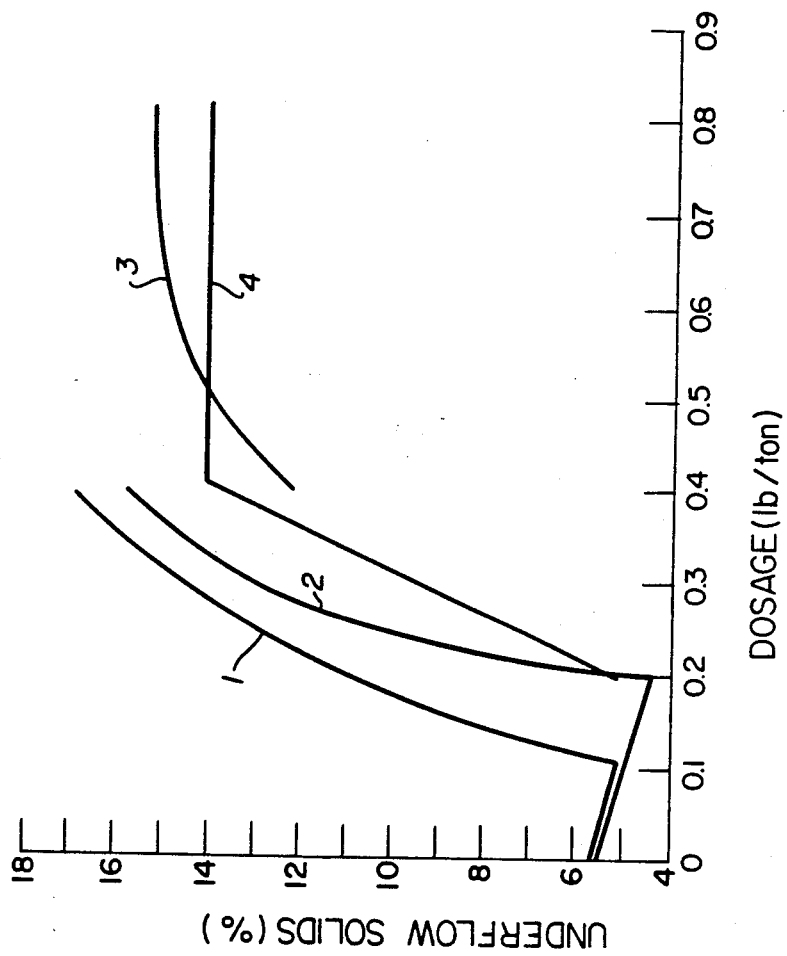
FIGS. 1–3 show the flocculation efficiency of terpolymers of the invention and three other polymers in three different phosphate slimes.

As is apparent from the foregoing summary, the polymers of the present invention may be terpolymers (when q is zero) or tetrapolymers. Both types of polymers are useful in flocculating aqueous solid suspensions and the selection of which type, and of the particular monomers in each polymer, will vary depending upon, for example, the specific suspension being flocculated, economic considerations (e.g., the cost of particular monomers), the desired rate of settling, and the desired degree of solids compaction, etc. These and other considerations will be fully discussed below so as to enable those skilled in the art to practice the present invention.

Due to the fact that the polymers of the invention are often of very high molecular weight, it may be difficult to determine the precise content of the hydrophobic monomer unit "A" in the polymer although there generally is no such difficulty in ascertaining the content, in the polymer, of the other monomer units. However, based on the known reactivity of a given hydrophobic monomer "A", the reactivities of the other monomers, the amount of all monomers present in the monomer emulsion to be polymerized and the polymerization conditions, the order of magnitude of the content of the hydrophobic monomer unit "A" in the resulting polymer may be determined. For example, for a preferred terpolymer of the invention derived by polymerizing a water-in-oil monomer emulsion containing 8-12 mole % of sodium "AMPS" monomer, 87-91 mole % of acrylamide monomer and about 1 mole % of vinyl acetate monomer, it is expected that the resulting polymer would contain a minimum of about 0.2-0.25 mole %, and probably close to that level, of total vinyl acetate (including unhydrolyzed and hydrolyzed vinyl acetate moieties). Therefore, the polymers of the invention may be described either in terms of the monomer content of the water-in-oil monomer emulsion polymerized to form such polymer, or in terms of the repeating unit contents of the polymer.

The polymers of the invention may be random or block copolymers although it is expected that they have both sections of random copolymer structure as well as other sections of block structure. It is not the purpose to limit the present invention to any particular type of structure.

The terpolymers of the present invention may be represented by the following formula:

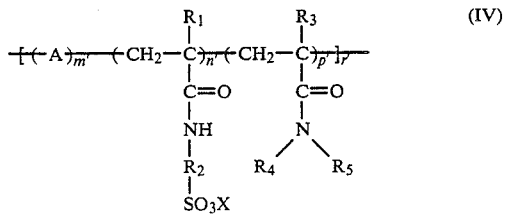

wherein:

(1) A' represents a repeating unit derived from a hydrophobic vinyl monomer having a water-solubility of less than about 5 weight percent, such as those monomeric repeating units represented by the formula:

wherein $R_6$ is —H or —CH$_3$; and $R_7$ is

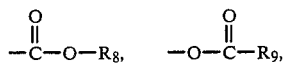

a halogen atom (e.g., chlorine), —O—$R_{10}$ or

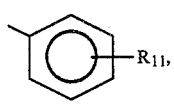

where $R_8$ is an alkyl group having from 1 to 12 carbon atoms, preferably 1 to 4 carbon atoms, most preferably a butyl group, $R_9$ is an alkyl group having from 1 to 4 carbon atoms, preferably a methyl group, $R_{10}$ is an alkyl group having from 1 to 6 carbon atoms, preferably from 2 to 4 carbon atoms, and $R_{11}$ is a hydrogen atom, a methyl group or an ethyl group, preferably a hydrogen atom or a methyl group. Examples of preferred hydrophobic vinyl monomers include vinyl acetate, styrene, alpha-methyl styrene, ethyl acrylate, methyl acrylate, ethyl methacrylate, methyl methacrylate, butyl acrylate, isobutyl acrylate, dodecyl acrylate, 2-ethylhexyl acrylate, vinyl proprionate, vinyl butyrate, propyl vinyl ether, butyl vinyl ether, methyl vinyl ether, ethyl vinyl ether, isobutyl vinyl ether, vinyl chloride, and vinylidene chloride.

(2) $R_1$ and $R_3$ are each a hydrogen atom or a methyl group although it is preferred that both $R_1$ and $R_3$ are hydrogen atoms;

(3) $R_2$ is a divalent hydrocarbon group having from 2 to 13 carbon atoms, such as alkylene groups having from 2 to 8 carbon atoms, cycloalkylene groups having from 6 to 8 carbon atoms, phenylene, and the like. Preferred divalent hydrocarbon groups include —C(CH$_3$)$_2$—CH$_2$—, —CH$_2$CH$_2$—, —CH$_2$CH$_2$CH$_2$—, —CH$_2$CH$_2$CH$_2$CH$_2$—,

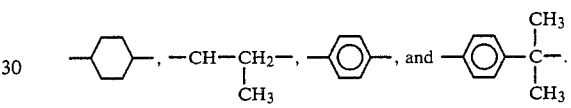

The most preferred $R_2$ grouping is —C(CH$_3$)$_2$—CH$_2$— which forms sodium "AMPS" when $R_1$ = hydrogen and X is sodium;

(4) X is a monovalent cation such as a hydrogen atom, an ammonium group, an alkali metal atom (e.g., Na or K), or an organoammonium group of the formula $(R_{15})(R_{16})(R_{17})$NH+ where $R_{15}$, $R_{16}$ and $R_{17}$ are each a hydrogen atom, an alkyl group having from 1 to 3 carbon atoms, or a hydroxyalkyl group having from 1 to 3 carbon atoms, and the like. The preferred cation is a sodium atom;

(5) $R_4$ and $R_5$ are each a hydrogen atom, a methyl group or an ethyl group although it is preferred that both $R_4$ and $R_5$ are hydrogen atoms;

(6) m' is about 0.1-10 mole %, preferably about 0.2-5 mole %;

(7) n' is about 1-40 mole %, preferably about 5-20 mole %;

(8) p' is about 50-98.9 mole %, preferably about 75-95 mole %;

(9) m'+n'+p'=100 mole %; and

(10) r' is a large positive integer, such as from about 1,000 to about 500,000.

Generally, it is preferred that the polymer be a high molecular weight, linear polymer since both characteristics tend to favor improved flocculation. Due to the high reactivities of the monomers represented by the n and p moieties in the above formula, especially sodium "AMPS" and acrylamide, the formation of very high molecular weight, linear polymers may be readily accomplished. The molecular weight of the terpolymer (as well as the tetrapolymer) of the invention is generally greater than about 500,000 and preferably is greater than about 1,000,000.

Some of the acetoxy or alkoxy groups of $R_7$ (i.e., the

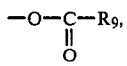

or $-O-R_{10}$ groups, respectively) may be hydrolyzed, resulting in a tetrapolymer which may be represented by the formula:

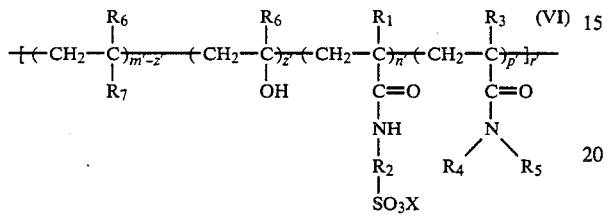

wherein $R_1$, $R_2$, $R_3$, $R_4$, $R_5$, $R_6$, $R_7$, X, m', n', p' and r' are as defined above, and z' is from about 0.1 to less than about 10 mole % and wherein $(m'-z')+z'+n'+p'=100$ mole %.

Alternatively, instead of defining the terpolymer repeating units as in (6)–(8) above, the terpolymer (and its hydrolyzed derivative) may be defined as the resulting from the polymerization of a water-in-oil monomer emulsion containing from about 0.1–20 mole %, preferably 0.2–10 mole % of monomer A', about 1–40 mole %, preferably about 5–20 mole %, of the $SO_3X$-containing monomer, and about 50–98.9 mole %, preferably about 75–95 mole %, of monomer

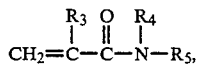

all based on the total moles of monomer in the emulsion.

Examples of suitable $SO_3X$-containing monomers are "AMPS" sodium "AMPS", and the like. The most preferred monomer is sodium "AMPS".

Examples, of suitable monomers of the formula

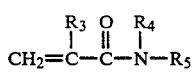

are acrylamide, methacrylamide, dimethylacrylamide, and the like. The most preferred monomer of this type is acrylamide.

The most preferred terpolymer is that resulting from the polymerization of a water-in-oil monomer emulsion containing about 8–12 mole % of sodium "AMPS" monomer, about 87–91 mole % of acrylamide monomer and about 1–5 mole % of viny acetate monomer. Such terpolymers are especially useful in flocculating phosphate slimes.

The tetrapolymers of the present invention may be represented by the following formula:

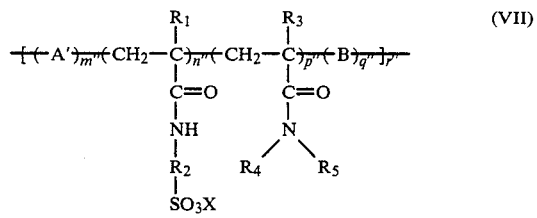

wherein A', $R_1$, $R_2$, $R_3$, $R_4$ and $R_5$ have the same meaning as defined above with respect to the terpolymer of the invention; wherein m", n", and r" have the same meaning as m', n' and r', respectively, defined above with respect to the terpolymer of the invention; and wherein (1) p" is about 20–98.9 mole %, preferably about 40–86.9 mole %;

(2) q" is greater than 0 and up to 40 mole %, preferably about 10–30 mole %;

(3) B represents a repeating unit derived from an ethylenically-unsaturated monomer containing a carboxylic acid group such as acrylic acid, methacrylic acid, maleic acid, and the like and salts thereof with alkali metals (e.g., sodium, potassium, etc.), ammonia (i.e., ammonium salts) and organic amines (e.g., amines represented by the formula $(R_{12})(R_{13})(R_{14})N$- wherein $R_{12}$, $R_{13}$ and $R_{14}$ are each a hydrogen atom, an alkyl group having from 1 to 3 carbon atoms, or a hydroxyalkyl group having from 1 to 3 carbon atoms such trimethylamine, triethanolamine, etc.). Examples of suitable monomers include acrylic acid, methacrylic acid, maleic acid, sodium acrylate, ammonium acrylate, trimethylammonium acrylate, and the like. The preferred B monomer is sodium acrylate.

Some of the alkoxy or acetoxy groups of the hydrophobic monomer A' may be hydrolyzed, resulting in a pentapolymer which may be represented by the formula:

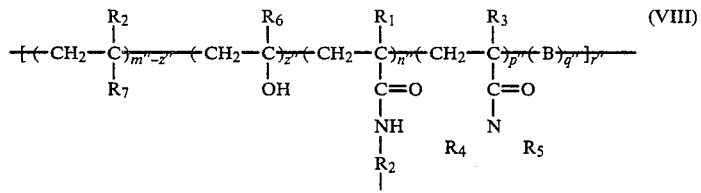

wherein $R_1$, $R_2$, $R_3$, $R_4$, $R_5$, $R_6$, $R_7$, X, B, m''', n''', p''', q''' and r''' are as defined above, and z'' is from about 0.1 to less than about 10 mole %.

Alternatively, instead of defining the tetrapolymer repeating units as above, the tetrapolymer (and its hydrolyzed derivative) may be defined as that resulting from the polymerization of a water-in-oil monomer emulsion containing about 0.1-20 mole %, preferably 0.2-10 mole % of monomer A', about 1-40 mole %, preferably abut 5-20 mole %, of the SO₃X-containing monomer, about 20-98.9 mole %, preferably about 40-86.9 mole %, of monomer

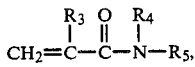

and greater than 0 to about 40 mole %, preferably about 10-30 mole %, of monomer "B", all based on the total moles of monomer in the emulsion.

The most preferred tetrapolymer of the invention is that resulting from the polymerization of a water-in-oil monomer emulsion containing about 6-10 mole % of sodium "AMPS" monomer, about 50-70 mole % of acrylamide monomer, about 1-5 mole % of vinyl acetate monomer and about 20-40 mole % of sodium acrylate monomer. Such tetrapolymers are especially useful in the flocculation of coal fines (e.g., blackwater).

The amounts of the sulfonic acid/sulfonate monomer and the carboxylic acid/carboxylate monomer may be varied depending upon a number of factors. For example, an "AMPS" monomer is relatively more expensive than the carboxylic acid/carboxylate monomer. Since the presence of both a strongly acidic group (i.e., the sulfonic acid/sulfonate group) and a weak acid (i.e., the carboxylic acid/carboxylate group) may provide a flocculant which is more versatile for a broader range of applications, the relative amounts may be tailored for particular applications and therefore the tetrapolymers may provide both improved performance and better economy.

The polymers of the present invention may be prepared using conventional techniques known to those skilled in the art, for example by standard water-in-oil emulsion polymerization processes. Such processes generally comprise emulsifying one or more water-soluble monomers in an oil phase and polymerizing the monomers in the resulting emulsion. It is preferred that the polymers of the invention be prepared as a water-in-oil emulsion in order to provide linear, high molecular weight polymers which may nevertheless be recovered as solutions containing high polymer concentrations. Ordinarily, such polymers may best be prepared by water-in-oil emulsion polymerization processes, such as the process disclosed in commonly-assigned, copending U.S. Pat. No. 4,485,209 (Fan et al.) the disclosure of which is hereby expressly incorporated herein by reference.

The monomers polymerized to form the polymers of the present invention are either commercially available or may be prepared by processes known to those skilled in the art. For example, the SO₃X-containing monomers may be made by processes disclosed in U.S. Pat. No. 3,506,707, the disclosure of which is hereby expressly incorporated herein by reference.

The water-in-oil emulsion polymerization process described in said U.S. Pat. No. 4,485,209, which may be used to prepare the polymers of the present invention, comprises the steps of:

(a) combining: (i) an aqueous phase comprising an aqueous solution containing at least one water-soluble monomer (i.e., the SO₃X-containing monomer, monomer

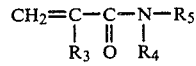

and monomer "B"), and (ii) an oil phase comprising a mixture of a hydrophobic liquid, a hydrophobic monomer (i.e., monomer A or A') and an oil-soluble surfactant;

(b) homogenizing the resulting mixture from (a) to form a water-in-oil emulsion followed by deoxygenating the emulsion;

(c) polymerizing the homogenized water-in-oil emulsion by adding thereto a deoxygenated initiator solution and heating the resulting mixture in a reactor under polymerization conditions so as to form a polymer water-in-oil emulsion; and (d) recovering a polymer water-in-oil emulsion.

A water-soluble surfactant may be added to the recovered water-in-oil emulsion to invert the emulsion on contact with water.

In the first step of the process, an aqueous solution containing one or more water-soluble monomers is combined with a mixture containing a hydrophobic liquid, a hydrophobic monomer and an oil-soluble surfactant. This combination of materials is homogenized to form a water-in-oil emulsion.

The aqueous solution contains a mixture of water-soluble monomers represented by the formulas:

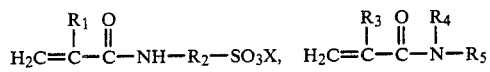

and, optionally, B, where $R_1$, $R_2$, $R_3$, $R_4$, $R_5$, X and B are as defined hereinabove. The acids (i.e., monomer "B" and the SO₃X-containing monomer) may first be reacted with a suitable base, preferably with an equivalent amount of base, such as sodium hydroxide, so that the resulting solution has a pH of from about 5.0 to about 10.0, preferably from about 6.5 to about 8.5, depending on the type and amount of base employed. The resulting solution may then be combined with another water-soluble monomer, such as acrylamide, and then with water to form the aqueous solution used in step (a).

The mixture which is combined with the aqueous solution containing the water-soluble monomers contains a hydrophobic liquid, a hydrophobic monomer (i.e., monomer A or A' as defined above) and an oil-soluble surfactant.

The particular hydrophobic liquid is not critical. Examples of suitable hydrophobic liquids for use herein include benzene, xylene, toluene, mineral oils, kerosenes, petroleum, mixtures thereof, and the like. A preferred hydrophobic liquid is an aliphatic hydrocarbon available from the Exxon Chemical Co. under the tradename Isopar M.

The particular surfactant is not critical. Examples of suitable surfactants are those of the oil-soluble type having a Hydrophile-Lipophile Balance (HLB) value of from about 1 to about 10, preferably from about 2 to about 6. These surfactants are normally referred to as the water-in-oil type. These suitable surfactants include fatty acid esters, such as sorbitan monolaurate, sorbitan monostearate, sorbitan monooleate (such as that available from I.C.I. under its tradename Span 80), sorbitan trioleate, etc.; mono- and diglycerides, such as mono and diglycerides obtained from the glycerolysis of edible fats, polyoxyethylenated fatty acid esters, such as polyoxyethylenated (4) sorbitan monostearate; polyoxyethylenated linear alcohols, such as Tergitol 15-S-3 and Tergitol 25-L-3 (both supplied by Union Carbide Corp.); polyoxyethylene sorbitol esters, such as polyoxyethylene sorbitol beeswax derivative; polyoxyethylenated alcohols such as polyoxyethylenated (2) cetyl ether, and the like.

The mixture of the aqueous phase and oil phase resulting from step (a) is homogenized to form a water-in-oil emulsion. Homogenization takes place by subjecting the mixture to high shear mixing techniques which are generally well-known in the art. These include the use of homogenizers, high speed mixers and any other techniques for obtaining high shear mixing. The homogenization is carried out at a temperature of from about 0° to about 30° C., preferably about 15° to 25° C. The homogenization may be carried out either continuously or in a batch process.

The emulsions so prepared have a rather narrow particle size distribution. The diameters of the majority of the particles range from about 0.2 to about 5 microns.

The resulting monomer water-in-oil emulsion comprises:

(a) from about 50 to about 80, preferably from about 60 to 78, weight percent, based on the total weight of the emulsion, of an aqueous phase containing the water-soluble monomers, wherein these monomers constitute from about 20 to about 80, preferably from about 25 to about 50, weight percent of the aqueous phase;

(b) from about 15 to about 45, preferably from about 20 to about 40, weight percent, based on the total weight of the emulsion, of an oil phase comprising the hydrophobic liquid and hydrophobic monomer(s), wherein these monomers constitute from about 0.1 to about 20, preferably from about 1 to 10, weight percent of the oil phase;

(c) from about 0.1 to about 5, preferably from about 1 to about 3, weight percent, based on the total weight of the emulsion, of the oil-soluble surfactant.

After forming the water-in-oil emulsion, either during or after addition to a reactor, it is generally deoxygenated by, for example, subjecting part or all of the emulsion to a vacuum of from about 50 to about 500, preferably from about 100 to about 200, mm of mercury under an inert gas atmosphere at a temperature of from about 0 to about 30° C., either continuously or as a batch process.

A catalyst or initiator useful in polymerizing ethylenically unsaturated monomers is also added to the reactor. These catalysts include azo- and peroxide-containing compounds known in the art and are added to the reactor either directly or in the form of a solution, i.e., the catalyst is dissolved in a solvent, such as a hydrocarbon liquid, e.g., toluene. The catalyst solution contains from about 1 to about 10, preferably from about 3 to about 6, weight percent of the catalyst.

From about 1 to about 99, preferably from about 20 to about 60, weight percent of the catalyst solution is initially added to the reactor containing the water-in-oil emulsion. The remaining water-in-oil emulsion and catalyst solution are then continually fed into the reactor.

The polymerization is carried out at a temperature of from about 30° to about 100° C., preferably from about 40° to about 70° C., most preferably from about 45° to about 55° C., for about 1 to about 10 hours, preferably from about 2 to about 6 hours. The reaction time depends on the size of the reactor and the polymerization conditions.

Alternatively, all of the reactants may be charged into a reactor and the polymerization conducted in a batch operation.

The polymerization is generally carried out at atmospheric pressure, although subatmospheric and superatmospheric pressures may be used. The polymerization is preferably carried out under an inert atmosphere, such as a helium, argon or nitrogen atmosphere.

The polymerization reaction generates considerable heat which must be removed. Generally, the heat is dissipated by normal cooling facilities.

The polymerization reaction rate may be controlled by the introduction of small quantities of air (atmospheric air and/or oxygen) into the reaction. The air may be introduced, i.e., sparged, either intermittently or continuously into the reactor to control the reaction temperature. When a continuous air sparging is employed, the amount of oxygen in the reaction medium must be carefully controlled so as to achieve the desired rate of polymerization. An oxygen content of from about 0.01 to about 1.0, preferably from about 0.02 to about 0.50, part per million is desirable. When the air is introduced intermittently, a flow rate of from about 0.01 to about 1.0, preferably from about 0.05 to about 0.5 cubic inches per minute per pound of reactor charge is desirable. The duration of air injection may vary from a fraction of a second to a few seconds, and it may be repeated as many times as necessary until a desired rate of polymerization is achieved.

After the polymerization is complete, an antioxidant may be added to the reaction mass. Any organic antioxidant suitable for the inhibition of free radical reactions may be used. The antioxidant is generally dissolved in a suitable solvent. The preferred antioxidants include substituted phenols (such as that available from Shell Chemical Co. under its tradename Ionol), thiobisphenol (such as is available from the Monsanto Chemical Co. under its tradename Santonox-R), and hydroquinone derivatives, such as the monomethyl ether of hydroquinone. The suitable solvents include toluene, benzene, xylene, diethyl ether, methyl acetate, and the like. The antioxidant is present in the solution in amounts of from about 0.1 to about 10, preferably from about 1 to about 5, weight percent.

The antioxidant solution is added to the reaction mass in amounts of from about 0.05 to about 5 parts per hundred parts of polymer. Addition of the antioxidant may be commenced either at the end of the polymerization or after the reaction mixture has been cooled to ambient temperature.

The reaction mass is generally cooled to about 25° C. and the polymer water-in-oil emulsion recovered.

The resulting polymer water-in-oil emulsion generally comprises:

(a) from about 50 to about 80, preferably from about 60 to about 78, weight percent, based on the weight of the entire emulsion, of an aqueous phase which contains therein from about 20 to about 80, preferably from about 25 to about 60, weight percent of polymer, based on the total weight of the aqueous phase;

(b) from about 15 to about 50, preferably from about 20 to about 40 weight percent, based on the weight of the entire emulsion, of a hydrophobic liquid and (c) from about 0.1 to about 5, preferably from about 1 to about 3, weight percent, based on the total weight of the emulsion, of an oil-soluble surfactant.

If desired, the polymer may be recovered by, for example, coagulation in a large excess of a non-solvent for the polymer, such as isopropyl alcohol. The polymer may then be collected by filtration and subsequently dried.

After the polymer water-in-oil emulsion is prepared, a water-soluble inverting surfactant may be added thereto. The polymer in the water-in-oil emulsion containing an inverting surfactant can be inverted in the presence of water releasing the polymer into the water in a very short period of time. The surfactants which may be used include polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation produces of higher fatty alcohols with ethylene oxide such as the reaction product of oleyl alcohol with 10 ethylene oxide units; condensation products of alkylphenols and ethylene oxide such as the reaction products of isooctyphenol with 12 ethylene oxide units; condensation products of higher fatty acid amines with five, or more, ethylene oxide units; ethylene oxide condensation products of polyhydric alcohol partial higher fatty esters and their inner anhydrides (e.g., mannitol anhydride, called Mannitan, and sorbitol anhydride, called Sorbitan). The preferred surfactants are ethoxylated nonyl phenols, ethoxylated nonyl phenol formaldehyde resins, and the like.

The inverting surfactant is used in amounts of from about 0.1 to about 20, preferably from about 1 to about 10 parts by weight per one hundred parts by weight of the polymer.

Although the foregoing process may be employed, the preferred mode of preparing the polymers (i.e., both ter- and tetra-polymers) of this invention is by a novel dual-initiator water-in-oil emulsion polymerization process disclosed in commonly-assigned, copending U.S. patent application Ser. No. 474,420, now abandoned and refiled Nov. 21, 1984 as U.S. patent application Ser. No. 674,951, the disclosure of which is hereby expressly incorporated herein by reference.

The so-called dual-initiator process disclosed in said application differs from the process described in said U.S. Pat. No. 4,485,209 in that two initiators are employed; a first, highly reactive, low temperature initiator to provide a shear-stable emulsion, and a second, less reactive initiator to complete the polymerization at higher temperatures. The presence of a small amount of polymer formed in situ at low temperatures by the action of the first initiator provides a highly stable emulsion resistant to degeneration by subsequent shearing and heating during the course of polymerization at higher temperatures. Further, product uniformity is greatly improved and gel formation is minimized and the improved emulsion stability permits greater flexibility in process design and a broader operating latitude.

The first, highly reactive initiator may be a free radical initiator capable of initiating polymerization of the monomers at a temperature between about 0° and 45° C., preferably between about 20° to 40° C. to provide a small amount of polymer. The specific amount of polymer thus produced will vary depending upon the monomers employed, the polymerization conditions, etc, and will be that amount necessary to provide a shear-stable emulsion. Examples of suitable initiators are azo compounds such as 2,2'- azobis (2,4-dimethyl-4-methoxyvaleronitrile) and peroxy compounds such as potassium persulfate, sodium bisulfite, etc.

The second, less reactive initiator may be a free radical initiator capable of initiating polymerization of the monomers at a temperature between about 40° to 100° C., preferably between about 45° to 80° C. Examples of suitable initiators are azo compounds such as 2,2'-azobis (2,4-dimethylvaleronitrile) and peroxy compounds such as benzoyl peroxide.

In the dual-initiator process (which is more fully described in said copending U.S. patent application Ser. No. 474,420), the first initiator may be added to the reactor containing the water-in-oil emulsion and, after polymerization has been initiated at a low temperature (i.e., during the heating up of the contents of the reactor) and a small amount of polymer is formed in the emulsion, the second initiator may be added thereto and the polymerization continued and completed at a higher temperature. Alternatively, both the first and second initiators may be present in the reactor from the beginning of the polymerization. The preferred manner of adding the initiators is sequential (i.e., the second being added after a small amount of polymer is formed).

An effectve method for heat removal, and one which is preferred, especially in conjunction with the dual-initiator process, involves the use of an external heat exchanger connected to the reactor through a closed loop. The reaction mixture may be circulated through the heat exchanger by a pump during the course of polymerization. Due to the fact that the dual-initiator process provides a shear-stable water-in-oil emulsion, such an external heat exchanger may be employed.

Under ordinary conditions, without the improvement afforded by the dual-initiator process, under the shear field generated by a high flow capacity pump, the stability of a conventional monomer emulsion is so marginal that such an operation cannot be carried out with any reasonable degree of reliability. In fact, emulsion breakdown often takes place at the early stages of polymerization leading to the formation of either coarse emulsion particles or gelation. Any conventional heat apparatus may be used to provide the external heat exchange loop. It is preferred to employ such an external heat exchanger so as to afford the maximum removal or dissipation of the heat generated during polymerization. The foregoing advantages should be obtained, however, regardless of the mechanical design of the reactor system employed.

Another embodiment of the present invention resides in the use of the polymers of the invention in flocculating aqueous solid suspension. The types of aqueous solid suspensions that can be treated in accordance with the present invention include phosphate slimes, suspensions derived from coal processing operations (such as so-called blackwater) and other mineral processing (waste) streams derived from mining of copper, iron (taconite), potash, kaolin and other clays, bauxite, etc., and other industrial waste streams such as paper fines, and the like.

The present invention is particularly useful in flocculating phosphate slimes and coal blackwater suspensions employing the polymers of the present invention.

As described above, the polymers of the invention are preferably prepared in the form of a water-in-oil emulsion which contains the polymer in concentrated form within the aqueous phase. For purposes of the present invention, the concentrated water-in-oil emulsion may be inverted to form a concentrated polymer solution which may thereafter be diluted with additional water. The resulting dilute solution may be added to the aqueous solid suspension being treated under appropriate floc-forming conditions, and thereafter allowing the suspended solids to settle from the suspension to thereby form an underflow of a more concentrated solid suspension and an essentially clear aqueous supernatant.

The concentrated aqueous solution formed from the polymer water-in-oil emulsion described above generally contains from about 0.01 to about 1.0, preferably from about 0.1 to about 0.5, weight percent of polymer, based on the total weight of the solution. This concentrated solution is then normally further diluted with additional water to provide a dilute solution containing from about 0.0005 to about 0.1, preferably from about 0.002 to about 0.05, weight percent of polymer, based upon the total weight of the dilute solution.

The dilute solution is then mixed with the aqueous solid suspension at one or more addition points. The amount of polymer solution employed will vary depending upon a number of factors, such as the type of aqueous solid suspension being treated, the desired rate of settling, degree of compaction and overflow clarity desired as well as the particular polymer employed, etc. It is also obviously desirable to employ the lowest amount of polymer dosage necessary to achieve a given settling rate, degree of compaction or overflow clarity, but it is often difficult to fix effective ranges of flocculant dosages (expressed either in terms of the weight of polymer per unit weight of aqueous solid suspension or the amount of polymer necessary to achieve a certain settling rate) for certain types of solid suspensions. As an example, the composition and properties of phosphate slimes obtained from the same mining locations may differ substantially. However, generally speaking, it is commercially desirable to obtain underflow solids for phosphate slimes on the order of about 12 to 20 weight % solids using conventional equipment and therefore the polymer flocculant dosage may be adjusted to achieve said degree of compaction. Alternatively, the polymeric flocculants of the present invention may be employed in amounts of from about 0.05 to about 2.0 pounds (of active polymer) per ton of suspended solids, although higher or lower dosages may be employed depending on the difficulty of flocculating a particular slime. Similarly, for coal processing waste suspensions, the polymeric flocculant may be employed in amounts of from about 0.001 to about 2.0 pounds (of active polymer) per ton of solid coal fines in suspension to obtain settling rates of about 5 to 10 inches/minute. Dosages for other systems may be easily fixed by those skilled in the art for a particular polymer.

As indicated above, the dilute solution of polymer is added to the aqueous solid suspension under appropriate floc-forming conditions, which include the appropriate or desired flocculant dosage, the concentration of the dilute flocculant solution, the selection of acceptable or desired mixing energies to achieve desirably large-sized flocs and the appropriate contact between the flocculant solution and the aqueous solid suspension. Upon addition of the dilute flocculant solution under appropriate flox-forming conditions, rapid separation of the suspended solids begins to occur, and with time, the suspended solids are flocculated and settled, thereby forming an underflow of a more concentrated solid suspension and an essentially clear supernatant.

The following examples are intended to illustrate the present invention, sometimes by comparison with prior art polymers, and are based upon and describe work that was actually performed. It is not intended to limit the scope of the present invention to the embodiments described in the following examples; rather, it is the intention that the present invention be limited only by the scope of the claims appended hereto.

EXAMPLE 1

An aqueous solution containing 79.1 grams of 2-acrylamido-2-methylpropane sulfonic acid ("AMPS") crystals and 92.85 grams of deionized water was neutralized with about 110.79 grams of a 40 weight % sodium hydroxide solution to a pH of about 6.25. The resulting sodium "AMPS" solution was then mixed with 205.69 grams of a 50 weight % aqueous solution of acrylamide, 0.03 grams of ethylenediamine tetracetic acid sodium salt, and 23.13 grams of deionized water. Separately, an oil phase was prepared by mixing 169.75 grams of an aliphatic hydrocarbon (available from the Exxon Chemical Co. under its tradename Isopar-M), 9.46 grams of sorbitan monooleate (available from I.C.I. under its tradename Span-80), and 10.64 grams of vinyl acetate. The two phases were combined and homogenized in a Waring blender to yield a uniform water-in-oil emulsion having a Brookfield viscosity of 448 centipoises (cps)(Model HBT at 10 RPM at 25° C.). The monomer emulsion was transferred to a one-liter Pyrex-glass polymerization kettle equipped with a turbine agitator, a thermometer, a condenser, an addition funnel and a nitrogen (air) inlet and outlet. The reactor was deaerated by sparging with nitrogen at a rate of 400 ml/min for a period of about 45 minutes. Thereafter, a solution of 0.195 gram of 2,2'-azobis (2,4-dimethylvaleronitrile) (available from the Du Pont Company under its tradename VAZO-52) in 9.39 grams of toluene was prepared and a 20% portion of the initiator solution was quickly introduced into the reactor. The polymerization was initiated by heating the kettle with an external water bath to about 52° C. Once the exotherm took place, the remaining initiator solution was added into the reactor at a rate of 0.7 ml/10 min. and the polymerization temperature was maintained by a combination of external cooling and air injection. The latter is a technique to control the rate of polymerization of the system by adjusting the dissolved oxygen levels in the monomer emulsion using alternative air and nitrogen spargings. The polymerization was completed in about 3 hours and a solution of 0.195 gram of thiobisphenol (available from the Monsanto Chemical Co. under its tradename Santonox-R) in 5 grams of toluene was introduced before discharging the product. The resultant product was a uniform water-in-oil emulsion which exhibited a Brookfield viscosity of 704 cps (Model HBT at 10 RPM at 25° C.).

EXAMPLE 2

A portion of the product prepared in Example 1, weighing 23.10 grams, was coagulated in 400 ml of isopropanol using a Waring blender. The coagulated, granular polymer was collected and dried in a vacuum oven at 55° C. 8.07 grams of dry polymer were obtained indicating that the conversion was essentially quantitative.

EXAMPLE 3

An 0.3 weight % polymer solution was prepared by dissolving the polymeric emulsion obtained in Example 1 in water in the presence of a small amount of a polyoxyethyleneated linear alcohol (available from Union Carbide Corporation under its tradename Tergitol-NP 10). A very viscous solution was obtained, and it exhibited a Brookfield viscosity of 1,376 cps (Model HBT at 10 RPM at 25° C.) and a pH of 6.32.

EXAMPLE 4

The intrinsic viscosity of the polymer prepared in Example 1 was measured in a one normal sodium chloride solution and was found to be 8.8 dl/g., indicating the product was of very high molecular weight.

EXAMPLE 5

The product prepared in Example 1 (having an I.V. of 8.8 dl/g was evaluated as a flocculant for coal blackwater at a dosage of 0.1 pound of polymer per ton of suspened solids, in combination with 0.1 pound per ton of a cationic flocculant (available from Allied Colloids under its tradename Percol-402) in a cylinder settling test. For comparison purposes, the combination of 0.1 pound per ton of a sodium acrylate (NaA)-containing anionic polymer flocculant having an I.V. of 9.5 dl/g (i.e., a 41.1 mole percent sodium acrylate/54.2 mole percent acrylamide/4.7 mole percent vinyl acetate terpolymer) and 0.1 pound per ton of Percol-402 was used as a control. The cylinder settling test involved placing a coal blackwater suspension in a cylinder, injecting the anionic polymer flocculant (i.e., the product prepared in Example 1 or the sodium acrylate-containing polymer) into the cylinder, inverting the cylinder 10 times, then injecting the cationic flocculant into the cylinder, inverting the cylinder an additional 10 times and then observing the rate at which the solids are flocculated and settled. The results are given in the table below.

| Flocculants | Settling Height* 2 mins | 5 mins | Solids Content** (wt. %) |
| --- | --- | --- | --- |
| Example 1 polymer + Percol-402 | 77 | 16 | 29 |
| NaA polymer + Percol-402 | 67 | 14 | 26 |

*The settling height is expressed as the location (expressed as a percentage of the original total height of the suspension in the cylinder), after the indicated time, of the flocculated solids/supernatant liquid interface.
**The solids content of the compacted material was determined after 24 hours and is expressed as weight percent solids.

EXAMPLE 6

The product prepared in Example 1, and other polymers for comparison, were evaluated as flocculants for a coal fines suspension in a cylinder settling test, conducted in the same manner as in Example 5. The results are shown in the table below.

| Flocculants | | Settling Rate (inches /min) | Percent Transmission[11] |
| --- | --- | --- | --- |
| Anionic (lb/ton) | Cationic (lb/ton) | | |
| Example 1 | C4[1] | | |
| (0.04) | (0.08) | 13 | 75 |
| (0.02) | (0.04) | 11 | 69 |
| (0.01) | (0.02) | 6 | 63 |
| Nalco-8872[2] | Nalco 8852[3] | | |
| (0.04) | (0.08) | 11 | 78 |
| (0.02) | (0.04) | 8 | 77 |
| (0.01) | (0.02) | 5 | 60 |
| Superfloc-208[4] | Superfloc-355[5] | | |
| (0.04) | (0.08) | 9 | 83 |
| (0.02) | (0.04) | 7 | 73 |
| (0.01) | (0.02) | 4 | 54 |
| Percol-156[6] | Percol-402[7] | | |
| (0.04) | (0.08) | 8 | 77 |
| (0.02) | (0.04) | 6 | 70 |
| (0.01) | (0.02) | 4 | 55 |
| Calgon M295[8] | Calgon M522D[9] | | |
| (0.04) | (0.08) | 9 | 76 |
| (0.02) | (0.04) | 5 | 60 |
| (0.01) | (0.02) | 3 | 30 |

-continued

| Flocculants | | Settling Rate (inches /min) | Percent Trans- mission[11] |
|---|---|---|---|
| Anionic (lb/ton) | Cationic (lb/ton) | | |
| NaA/AM/VAc[10] | C4[1] | | |
| (0.04) | (0.08) | 13 | 76 |
| (0.02) | (0.04) | 12 | 73 |
| (0.01) | (0.02) | 8 | 30 |

Note [1] A cationic polymer flocculant obtained from Rhone-Poulenc, France.
Note [2] An anionic polyacrylamide flocculant available from the Nalco Chemical Company as Nalco 8872.
Note [3] A polymeric cationic flocculant available from the Nalco Chemical Company as Nalco 8852.
Note [4] An anionic acrylamide copolymer flocculant available from the American Cyanamid Company as Superfloc 208.
Note [5] A cationic polymer flocculant available from the American Cyanamid Company as Superfloc 355.
Note [6] An anionic polymer flocculant available from Allied Colloids as Percol-156.
Note [7] An cationic polymer flocculant available from Allied Colloids as Percol-402.
Note [8] An anionic polymer flocculant available from Calgon as Calgon M295.
Note [9] A cationic polymer flocculant available from Calgon as M552D.
Note [10] A terpolymeric flocculant comprising 41.1 mole percent sodium acrylate, 54.2 mole percent acrylamide and 4.7 mole percent vinyl acetate.
Note [11] Percentage transmission data is given as the percent transmission after 2 minutes.

EXAMPLE 7

Example 1 was repeated with the exception that the polymerization was carried out at 45° C. and the initiator used was 2,2′-azobis (2,4-dimethyl-4-methoxyvaleronitrile) (available from the Du Pont Company under its tradename VAZO-33) instead of VAZO-52. A uniform, milky, water-in-oil emulsion was obtained. The conversion was essentially quantitative and the resultant product exhibited the following properties:
  Polymer Emulsion Viscosity: 752 cps (Model HBT at 10 RPM at 25° C.)
  0.3% Solution Viscosity: 1,376 cps (Model HBT at 10 RPM at 25° C.)
  Intrinsic Viscosity, dl/g.: 10.0 (in 1 N NaCl Solution)

EXAMPLE 8

Example 1 was repeated with the exception that the 10.64 grams of vinyl acetate was replaced with the same amount of styrene. After polymerization, a milky, uniform, water-in-oil emulsion was obtained. The emulsion was found to contain 31 weight % polymer by the isopropanol coagulation test described in Example 2. An 0.3 weight % aqueous solution of this polymer exhibited a Brookfield viscosity of 740 cps (Model HBT, 10 RPM at 25° C.).

EXAMPLE 9

Example 1 was repeated with the exception that the 10.64 grams of vinyl acetate was replaced with the same amount of alpha-methyl styrene. After polymerization, a milky, uniform, water-in-oil emulsion was obtained. The emulsion was found to contain 28 weight % polymer by the isopropanol coagulation test described in Example 2. The polymer exhibited an intrinsic viscosity of 8.8 dl/g (deciliter/gram) in a 1 N NaCl solution. An 0.3 weight % aqueous solution of this polymer exhibited a Brookfield viscosity of 1,380 cps (Model HBT, 10 RPM at 25° C.).

EXAMPLE 10

A preparative method similar to that employed in Example 1, but using a unique dual-initiator system, was employed. An aqueous solution containing 138.13 grams of deionized water and 57.2 grams of "AMPS" (Lubrizol Grade 2404) was neutralized with about 22.50 grams of a 50 weight % caustic solution to a pH of 7.5. The resulting sodium "AMPS" solution was then mixed with 283.87 grams of a 50 weight % aqueous solution of acrylamide, and 0.245 gram of a pentasodium salt of diethylene triamine pentaacetic acid chelating agent (available from the Dow Chemical Co. under its tradename Versenex-80). Separately, an oil phase was prepared by mixing 169.75 grams of Isopar-M, 9.46 grams of Span-80, and 1.9 grams of vinyl acetate. The two phases were then combined and homogenized in a Waring blender to yield a uniform, milky, water-in-oil emulsion. The latter exhibited a Brookfield viscosity of 1,288 cps (Model HBT, 10 RPM at 25° C.). The monomer emulsion was transferred to a one-liter Pyrex-glass polymerization kettle similarly equipped as that described in Example 1. After deaeration, an initiator solution consisting of 0.012 gram of VAZO-33 in 1.5 grams of toluene was introduced. The kettle temperature was raised using an external water bath until the polymerization was initiated. Thereafter, the polymerization temperature was maintained at 50° C. by external cooling and the air injection technique described in Example 1. Simultaneously, a second initiator solution consisting of 0.1755 gram of VAZO-52 in 7.5 grams of toluene was fed into the reactor at a rate of about 1.5 ml per every 10 minutes. The polymerization was completed in about three hours and a solution consisting of 0.195 gram of Santonox-R in 5 grams of toluene was introduced. The reactor was cooled to room temperature and the product was discharged. The resultant water-in-oil emulsion possessed a Brookfield viscosity of 1,128 cps (Model HBT, 10 RPM at 25° C.). The polymer exhibited an intrinsic viscosity (in 1 N NaCl solution) and a Brookfield solution viscosity (0.3 weight % polymer concentration measured with a HBT Model at 10 RPM at 25° C.) of 10 dl/g and 1,280 cps, respectively.

EXAMPLES 11–29

Using the procedures described in Example 10, a variety of "AMPS"-containing terpolymers of different compositions and intrinsic viscosities (molecular weights) were prepared. The formulation variations and the characteristics of the finished products are compiled in the following Table I:

TABLE I

| | Terpolymer[9] Composition (Mole %) | | | | | 0.3% Solution Viscosity (cps) | | |
|---|---|---|---|---|---|---|---|---|
| Example | VAc[1] | Na "AMPS"[2] | AM[3] | "AMPS" Type Used | Active polymer (%) | I.V.[4] (dl/g) | HBT[5] | LVT[6] |
| 11 | 5.5 | 8.2 | 86.3 | Lubrizol 2412 | 28.9 | 11.0 | 900 | 3,050 |
| 12 | 1.0 | 12.3 | 86.7 | 2412 | 29.5 | 6.0 | 830 | 2,000 |
| 13 | 1.0 | 12.0 | 87.0 | 2404 | 29.5 | 7.0 | 5,240 | 36,700 |

TABLE I-continued

| Example | Terpolymer[9] Composition (Mole %) | | | "AMPS" Type Used | Active polymer (%) | 0.3% Solution Viscosity (cps) | | |
|---|---|---|---|---|---|---|---|---|
| | VAc[1] | Na "AMPS"[2] | AM[3] | | | I.V.[4] (dl/g) | HBT[5] | LVT[6] |
| 14 | 1.0 | 12.3 | 86.7 | 2401 | 29.5 | 6.0 | V. Low | V. Low |
| 15 | 1.0 | 12.0 | 87.0 | 2404 | 29.5 | 7.5 | 2,620 | 13,350 |
| 16 | 1.0 | 12.0 | 87.0 | 2404 | 25 | 8.7 | 1,920 | 8,200 |
| 17 | 1.0 | 12.0 | 87.0 | 2404 | 20 | 11.5 | 1,570 | 9,200 |
| 18 | 1.0 | 12.0 | 87.0 | 2404 | 29.5 | 15.0 | 2,370 | 12,000 |
| 19 | 1.0 | 12.0 | 87.0 | 2405 | 29.5 | 12.0 | 1,850 | 7,600 |
| 20 | 1.0 | 12.0 | 87.0 | 2405 | 25 | 13.5 | 1,340 | 9,900 |
| 21 | 1.0 | 12.0 | 87.0 | 2404 | 20 | 15.0 | 1,440 | 10,800 |
| 22 | 2.7 | 11.8 | 85.5 | 2405 | 29.5 | 12.0 | 1,090 | 5,050 |
| 23 | 5.1 | 11.5 | 83.4 | 2405 | 29.5 | 11.7 | 1,000 | 5,200 |
| 24 | 1 | 14.4 | 84.6 | 2405 | 29.5 | 12.5 | 1,440 | 8,150 |
| 25 | 0.9 | 9.9 | 89.2 | 2405 | 29.5 | 12.0 | 1,150 | 5,300 |
| 26 | 0.9 | 7.8 | 91.3 | 2405 | 29.5 | 11.0 | 1,150 | 3,450 |
| 27 | 0.9 | 5.9 | 93.2 | 2405 | 29.5 | 9.0 | 1,150 | 2,950 |
| 28 | 1.0 | 12.0 | 87.0 | 2405 | 25 | 12.5 | 1,470 | 8,900[7] |
| 29 | 1.0 | 12.0 | 87.0 | 2405 | 25 | 12.5 | 1,440 | 8,800[8] |

[1]VAc = vinyl acetate
[2]Na "AMPS" = sodium "AMPS"
[3]AM = acrylamide
[4]measured in 1 N NaCl solution
[5]Brookfield viscometer Model HBT at 10 RPM and 25° C.
[6]Brookfield viscometer Model LVT at 0.6 RPM and 25° C.
[7]only ½ of Versenex-80 charge used
[8]twice Versenex-80 charge used
[9]expressed as the mole percentages of the respective monomers in the starting monomer emulsion

EXAMPLE 30

The method of preparation of tetra-polymers containing both "AMPS" and acrylic acid, or their salts, is described in this example. An aqueous solution containing 15.82 grams of "AMPS", 63.28 grams of acrylic acid and 138.13 grams of deionized water was neutralized with about 76.2 grams of a 50 weight % caustic solution to a final pH of 7.48. The resulting Na "AMPS"/Na acrylate solution was then mixed with 205.69 grams of an aqueous 50 weight % acrylamide solution and 0.194 gram of Versenex-80. Separately, an oil phase was prepared by mixing 169.75 grams of Isopar-M, 9.46 grams of Span-80, and 10.64 grams of vinyl acetate. The two phases were then combined and homogenized in a Waring blender to yield a uniform, milky, water-in-oil emulsion. The latter exhibited a Brookfield viscosity of 640 cps (Model HBT, 10 RPM at 25° C.). The monomer emulsion was then transferred to a one-liter Pyrex-glass polymerization kettle and was polymerized using the dual-initiator system in a manner similar to that described in Example 10. A uniform, milky, water-in-oil emulsion containing about 30 weight % active polymer was obtained. The emuslion and a 0.3 weight % aqueous solution of the polymer exhibited Brookfield viscosities of 1,048 and 2,496 cps, respectively. The polymer possesed an intrinsic viscosity of 16.0 dl/g (in 1 N NaCl solution).

EXAMPLE 31

The polymr prepared in Example 30 was evaluated as a flocculant for the dewatering of a Florida phosphate slime. A $t_{70}$ cylinder test was employed and the results are shown below:

| Flocculant | Dose (lb/ton*) | $t_{70}$ (sec) |
|---|---|---|
| Example 30 polymer | 1 | 10.8 |
| None | — | very long |

*lb of active polymer per ton of suspended solids.

The $t_{70}$ cylinder test was conducted by pouring phosphate slime and diluted flocculant solution through a funnel into a breaker containing a rotating rake. The time $t_{70}$ given in the above table is the time necessary for the flocculated solids/supernatant liquid interface to fall to 70 percent of the original height of the phosphate slime in the cylinder.

EXAMPLE 32

The polymer prepared in Example 30 was evaluated as a flocculant for the treatment of coal-clay blackwater. Tests were conducted by measuring both the settling rate and clarity of the supernatant liquid phase. Two terpolymers, one containing no sodium "AMPS" and the other containing no sodium acrylate, were used as controls:

| Flocculant | $C_{SR}$[(1)] | $C_{CL}$[(2)] |
|---|---|---|
| Example 30 polymer | 0.06 | 0.07 |
| A terpolymer containing no sodium acrylate[(3)] | 0.14 | 0.24 |
| A terpolymer containing no sodium "AMPS"[(4)] | 0.17 | 0.12 |

[(1)]$C_{SR}$ = polymer concentration (#/ton) to produce settling rate of 10"/minute
[(2)]$C_{CL}$ = polymer concentration (#/ton) to produce supernatant clarity of 50%
[(3)]8.2 mole % Na "AMPS"/86.3 mole % acrylamide/5.5 mole % vinyl acetate
[(4)]54.3 mole % acrylamide/41.1 mole % sodium acrylate/4.6 mole % vinyl acetate

EXAMPLES 33-37

Using the preparative method described in Example 30, the following tetrapolymer emulsions (all having an active polymer content of 29.5 weight %) were prepared by varying the monomer-feed compositions:

| Example | Tetrapolymer[5] Composition (Mole %) | | | | "AMPS" Type Used | 0.3% Solution Viscosity (cps) | | |
|---|---|---|---|---|---|---|---|---|
| | VAc | Na "AMPS" | NaA[1] | AM | | I.V.[2] (dl/g) | HBT[3] | LVT[4] |
| 33 | 0.9 | 10 | 4.3 | 84.8 | Lubrizol 2405 | 13.2 | 2,620 | 10,200 |
| 34 | 0.9 | 8 | 8.3 | 82.8 | 2405 | 14.0 | 1,890 | 11,200 |
| 35 | 0.9 | 6.8 | 12.0 | 80.3 | 2405 | 15.0 | 1,630 | 11,800 |
| 36 | 5.3 | 8.3 | 23.8 | 62.6 | 2402 | 10.3 | 1,570 | 8,550 |
| 37 | 4.7 | 1.6 | 39.5 | 54.2 | 2402 | 8.9 | 2,750 | 26,550 |

[1]Na A = sodium acrylate
[2]measured in 1 N NaCl solution at 25° C.
[3]Brookfield viscometer Model HBT at 10 RPM and 25° C.
[4]Brookfield viscometer Model LVT at 0.6 RPM and 25° C.
[5]Expressed as the mole percentages of the respective monomers in the starting monomer emulsion

EXAMPLE 38

A series of laboratory flocculation tests were performed on different Florida phosphate slimes using different polymer flocculants. These tests were performed using a 3.5 inch Enviro-Clear laboratory thickener unit (manufactured by the Enviro-Clear Division of Amstar Corporation, Somerville, N.J. 08876). In each test, the raw Florida phosphate slime was metered, with diluted polymer flocculant solution, through an in-line static mixer into the thickener unit, which separated the combined feed stream into a clear overflow liquid (i.e., supernatant) and a thickened underflow. Previously-calibrated Masterflex pumps were used to meter the phosphate slime, the diluted polymer flocculant solution and also for the removal of the underflow stream.

Flocculant dosages (expressed as pounds of active polymer per ton of slime) were determined from the measured flow rates of diluted polymer flocculant solution (of a known concentration) and slime (both in cubic centimeters/minute, cc/min) and the weight percent solids of the feed slime. Underflow solids (expressed as the weight % of solids in the underflow stream) were obtained after 30 minutes running time by removing two underflow samples and drying them to a constant weight under heat lamps. The data are reported as (weight %) underflow solids versus (1lbs./ton) flocculant dose in FIGS. 1–7 of the drawings.

FIG. 1 of the drawings compares the flocculating efficiency of four different polymers (identified in FIG. 1 using the same numbers as below) on the same beige Florida phosphate slime:

(1) the terpolymer of Example 19;

(2) a prior art copolymer believed to contain 12 mole % sodium "AMPS" and 88 mole % acrylamide;

(3) a 75 mole % acrylamide/ 25 mole % sodium acrylate copolymer (available from the Nalco Chemical company under its tradename Nalco 7873); and (4) a 54.2 mole % acrylamide/4.7 mole % vinyl acetate/41.1 mole % sodium acrylate terpolymer (of the type described in the aforementioned U.S. Pat. No. 4,529,782). Based on FIG. 1, it is apparent that the terpolymer of the present invention is significantly more efficient, in this slime, than the other polymers tested, especially at dosages above about 0.1 lbs/ton.

Figure 2:
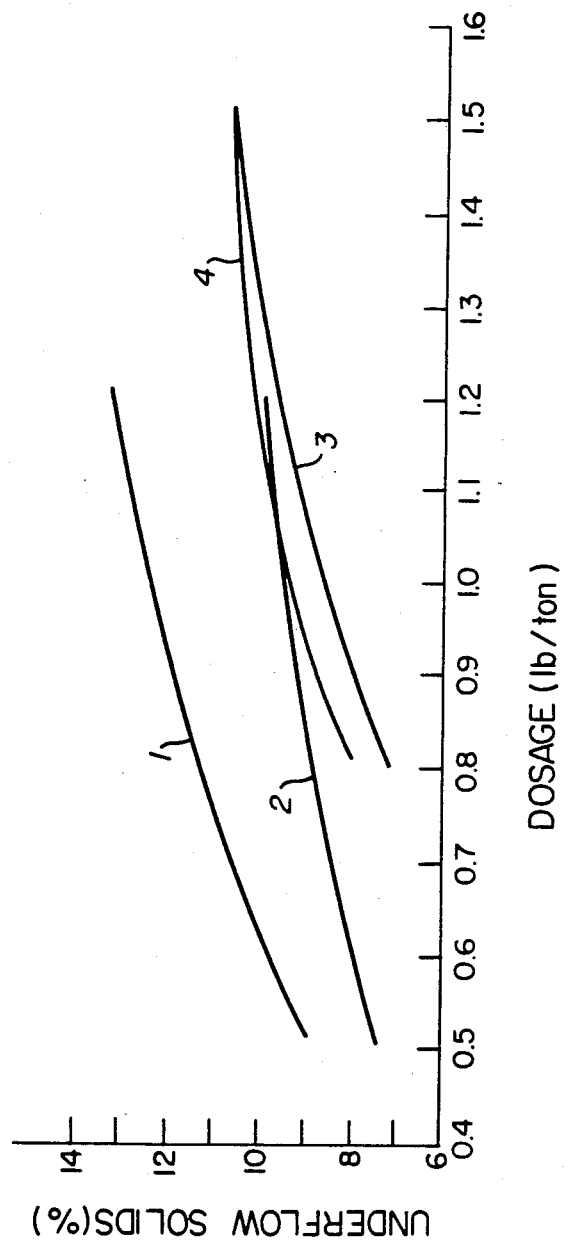
Figure 3:
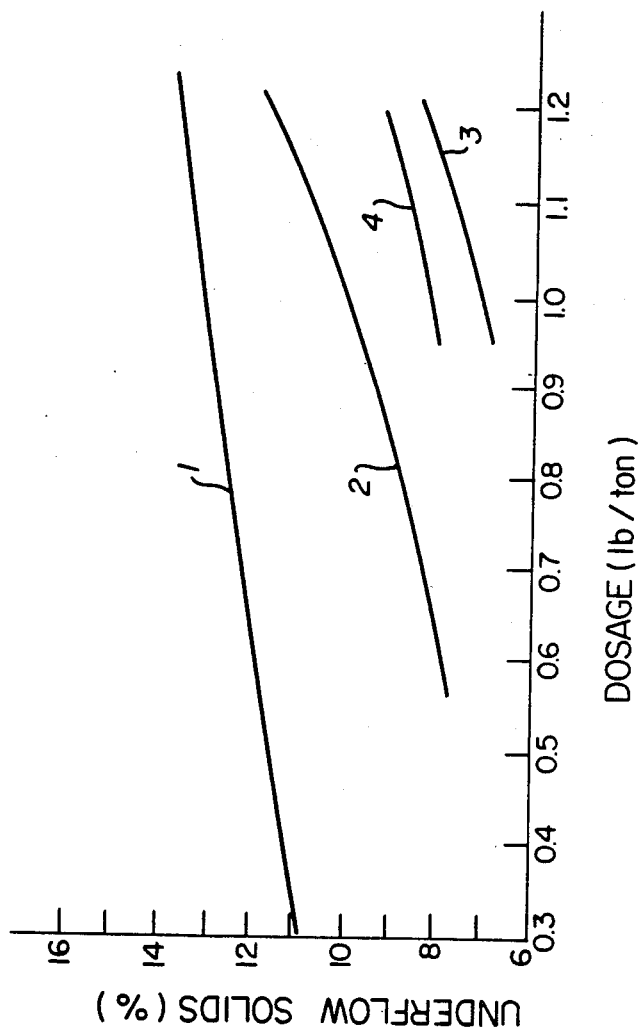

FIGS. 2 and 3 show the results of similar comparisons, using the same polymers as in FIG. 1, on two different Florida gray phosphate slimes. Based on the data shown in FIGS. 2 and 3, the polymer of the present invention is more efficient in these slimes in comparison to the other polymers tested.

Figure 4:
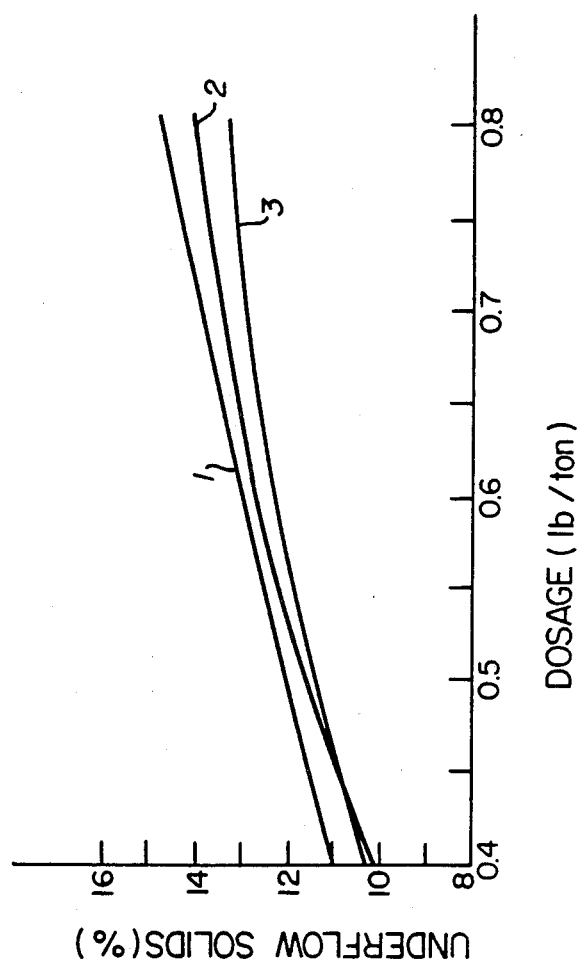
FIG. 4 shows the flocculation efficiency of (1) a sodium "AMPS"/acrylamide/vinyl acetate terpolymer, (2) a sodium "AMPS"/acrylamide copolymer prepared by the dual-initiator process and (3) a prior art sodium "AMPS"/acrylamide copolymer, in a phosphate slime.

FIG. 4 shows the flocculation efficiency, in a beige Florida phosphate slime, of:

(1) a 12.4 mole % sodium "AMPS"/87.6 mole % acrylamide copolymer prepared by a dual-initiator process as in Example 10;

(2) the terpolymer of Example 19; and (3) a prior art copolymer believed to contain 12 mole % sodium "AMPS" and 88 mole % acrylamide.

Figure 5:
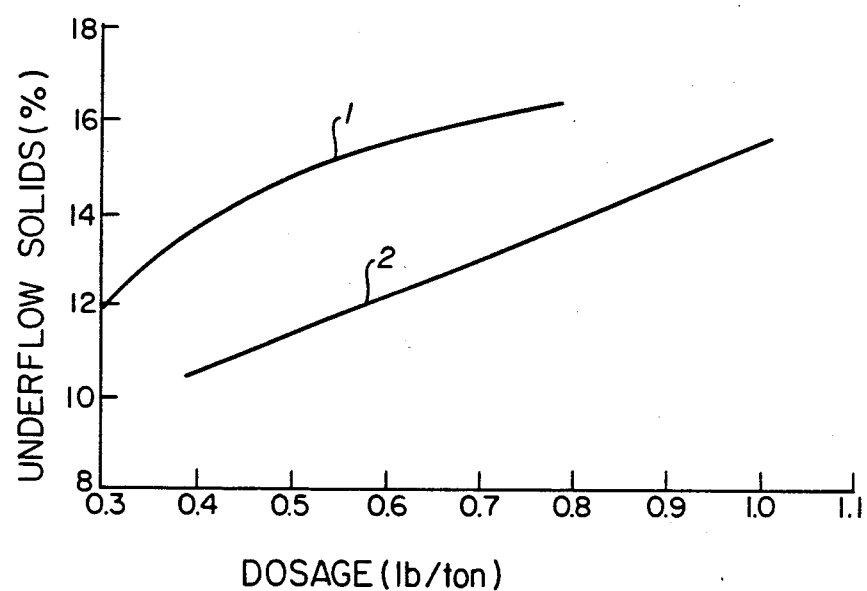
FIG. 5 shows the flocculation efficiency, in a phosphate slime, of a sodium "AMPS"/acrylamide/vinyl acetate terpolymer and a sodium "AMPS"/acrylamide copolymer prepared by the dual-initiator process.

FIG. 5 shows the flocculation efficiency, in a beige Florida phosphate slime believed to be low in Attapulgite clay, of:

(1) a sodium "AMPS"/acrylamide/vinlyl acetate terpolymer, prepared as in Example 10, but from a monomer emulsion containing 0.8 mole % vinyl acetate, 19.4 mole % sodium "AMPS" and 79.8 mole % acrylamide; and (2) the same copolymer designated (1) in FIG. 4.

Figure 6:
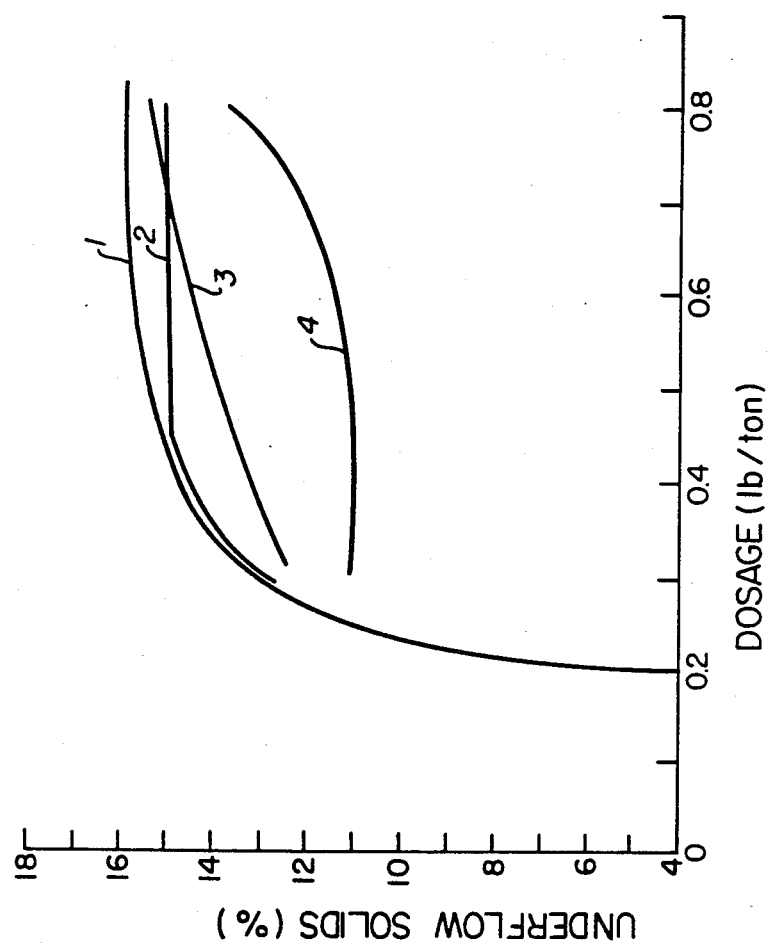
FIG. 6 compares the flocculation efficiency, in a phosphate slime, of three sodium "AMPS"/acrylamide/vinyl acetate terpolymers (having different vinyl acetate contents) and a sodium "AMPS"/acrylamide copolymer prepared by the dual-initiator process.

FIG. 6 shows the flocculation efficiency, in a gray Florida phosphate slime, of:

(1) the same copolymer designated (1) in FIG. 4;

(2) the terpolymer of Example 19; and (3) and (4) terpolymers prepared as in Example 10 but starting from a monomer emulsion containing 2.7 mole % and 5.1 mole %, as in Examples 22 and 23 respectively, vinyl acetate rather than 1 mole % as in Example 19.

FIG. 7 shows the % underflow solids obtained as a function of the vinyl acetate contents of the same polymers as in FIG. 6, for two different dosages, in a different, beige Florida phosphate slime. The data points on the two curves at 0, 1, 2.7 and 5.1 mole % vinyl acetate represent polymers designated (1), (2), (3) and (4), respectively, in FIG. 6, whereas the other two data points represent two dosages of the prior art copolymer designated (3) in FIG. 4.

Based on the foregoing and the data shown in FIGS. 1–7, it will be appreciated that the polymers of the present invention, generally speaking, are improved flocculants in comprison to known polymeric flocculants of the prior art.

What is claimed is:

1. A water-soluble polymer having a high molecular weight of greater than 500,000 resulting from the polymerization of a water-in-oil monomer emulsion containing about 0.1–20 mole % of a hydrophobic vinyl monomer having a water-solubility of less than about 5 weight % in the oil phase; about 1-40 mole % of a monomer represented by the formula:

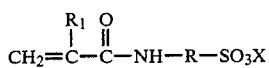

wherein $R_1$ represents a hydrogen atom or a methyl group, $R_2$ represents a divalent hydrocarbon group having from 2 to 13 carbon atoms and X represents a monovalent cation; about 20-98.9 mole % of a monomer represented by the formula:

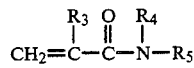

wherein $R_3$ represents ahydrogen atom or a methyl group, and $R_4$ and $R_5$ are each a hydrogen atom, a methyl group or an ethyl group; and from 0 up to about 40 mole % of an ethylenically-unsaturated carboxylic acid or its salt; based on the total moles of monomer in said emulsion.

2. The polymer of claim 1 represented by the formula:

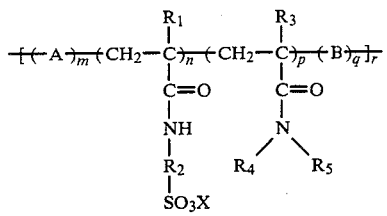

wherein A represents a repeating unit derived from a hydrophobic vinyl monomer having a water-solubility of less than about 5 weight %; $R_1$ and $R_3$ are each a hydrogen atom or a methyl group; $R_2$ represents a divalent hydrocarbon group having from 2 to 13 carbon atoms; $R_4$ and $R_5$ are each a hydrogen atom, a methyl group or an ethyl group; X represents a monovalent cation, B represents a repeating unit derived from an ethylenically- unsaturated carboxylic acid or its salt; m is about 0.1-10 mole %, n is about 1-40 mole %, p is about 20-98.9 mole %, and q is about 0-40 mole % with the proviso that m+n+p+q=100 mole %; and r is a large positive integer.

3. The polymer of claim 2 wherein r is from about 1,000 to about 500,000.

4. The polymer of claim 2 wherein the polymer molecular weight is greater than 1,000,000.

5. The polymer of claim 2 wherein said polymer is a linear polymer.

6. The polymer of claim 5 wherein A represents a monomeric repeating unit represented by the formula:

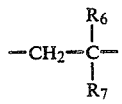

wherein $R_6$ is a hydrogen atom or a methyl group; $R_7$ is

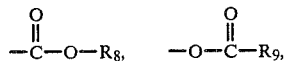

a halogen atom, $-O-R_{10}$ or

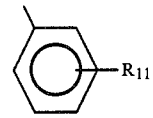

wherein $R_8$ is an alkyl group having from 1 to 12 carbon atoms; $R_9$ is an alkyl group having from 1 to 4 carbon atoms; $R_{10}$ is an alkyl group having from 1 to 6 carbon atoms; and $R_{11}$ is a hydrogen atom, a methyl group or an ethyl group.

7. The polymer of claim 5 wherein $R_2$ is an alkylene group having from 2 to 8 carbon atoms.

8. The polymer of claim 5 wherein B is selected from the group consisting of acrylic acid, methacrylic acid, and salts thereof with an alkali metal, ammonia, or an organic amine.

9. The polymer of claim 5 which comprises a polymer resulting from the polymerization of a water-in-oil monomer emulsion containing about 6-10 mole % of sodium 2-acrylamido-2-methylpropane sulfonate monomer, about 50-70 mole % of acrylamide monomer, about 0.1-20 mole % of vinyl acetate monomer and about 20-40 mole % of sodium acrylate monomer, all based on the total moles of monomer in the emulsion.

10. The polymer of claim 6 wherein at least a portion of said monomeric repeating unit A is hydrolyzed to provide a polymer represented by the formula:

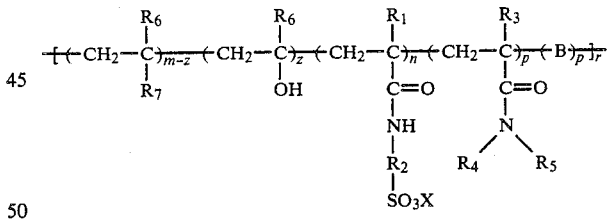

wherein $R_1$, $R_2$, $R_3$, $R_4$, $R_5$, $R_6$, $R_7$, X, B, m, n, p, q and r are as defined in claim 2 and z is from about 0.1 to less than about 10 mole % and wherein (m−z)+z+n+p+q=100 mole %.

11. The polymer of claim 1 represented by the formula:

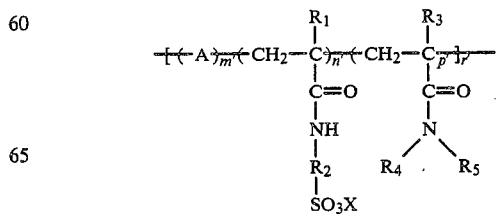

wherein A represents a repeating unit derived from a hydrophobic vinyl monomer having a water-solubility of less than about 5 weight %; $R_1$ and $R_3$ are each a hydrogen atom or a methyl group; $R_2$ represents a divalent hydrocarbon group having from 2 to 13 carbon atoms; $R_4$ and $R_5$ are each a hydrogen atom, a methyl group or an ethyl group; X represents a monovalent cation; m' is about 0.1–10 mole %, n' is about 1–40 mole % and p' is about 50–98.9 mole % with the proviso that m'+n'+p'=100 mole %; and r' is a large positive integer.

12. The polymer of claim 11 wherein r' is from about 1,000 to about 500,000.

13. The polymer of claim 11 wherein the polymer molecular weight is greater than 1,000,000.

14. The polymer of claim 11 wherein said polymer is a linear polymer.

15. The polymer of claim 14 wherein A represents a monomeric repeating unit represented by the formula:

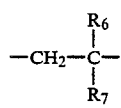

wherein $R_6$ is a hydrogen atom or a methyl group; $R_7$ is

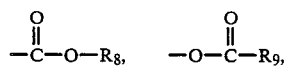

a halogen atom, $-O-R_{10}$ or

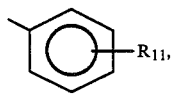

wherein $R_8$ is an alkyl group having from 1 to 12 carbon atoms; $R_9$ is an alkyl group having from 1 to 4 carbon atoms; $R_{10}$ is an alkyl group having from 1 to 6 carbon atoms; and $R_{11}$ is a hydrogen atom, a methyl group or an ethyl group.

16. The polymer of claim 11 wherein $R_2$ is an alkylene group having from 2 to 8 carbon atoms.

17. The polymer of claim 11 which comprises a polymer resulting from the polymerization of a water-in-oil monomer emulsion containing about 8–12 mole % of sodium 2-acrylamido-2-methylpropane sulfonate monomer, about 87–91 mole % of acrylamide monomer and about 0.1–20 mole % of vinyl acetate monomer.

18. The polymer of claim 15 wherein at least a portion of said monomeric repeating unit A is hydrolyzed to provide a polymer represented by the formula:

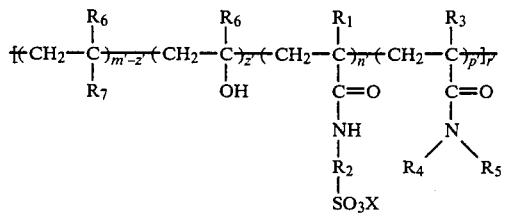

wherein $R_1$, $R_2$, $R_3$, $R_4$, $R_5$, $R_6$, $R_7$, X, m', n', p' and r' are as defined in claim 11 and z' is from about 0.1 to less than about 10 mole % and wherein (m'−z')+z'+n'+p'=100 mole %.

19. The polymer of claim 1 resulting from the polymerization of a water-in-oil monomer emulsion containing about 0.1–20 mole % of a hydrophobic vinyl monomer having a water-solubility of less than about 5 weight % in the oil phase; about 1–40 mole % of a monomer represented by the formula:

wherein $R_1$ represents a hydrogen atom or a methyl group, $R_2$ represents a divalent hydrocarbon group having from about 2 to 13 carbon atoms and X represents a monovalent cation; and about 50–98.9% mole % of a monomer represented by the formula:

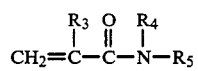

wherein $R_3$ represents a hydrogen atom or a methyl group, and $R_4$ and $R_5$ are each a hydrogen atom, a methyl group or an ethyl group; based on the total moles of monomer in said emulsion.

20. A polymer water-in-oil emulsion comprising (a) from about 50 to about 80 weight %, based on the weight of the emulsion, of an aqueous phase which contains therein from about 20 to about 80 weight %, based on the weight of said aqueous phase, of the polymer of claim 1; (b) from about 15 to about 50 weight %, based on the weight of the emulsion, of a hydrophobic liquid; and (c) from about 0.1 to about 5 weight %, based on the weight of the emulsion, of an oil-soluble surfactant.

21. A polymer water-in-oil emulsion comprising (a) from about 50 to about 80 weight %, based on the weight of the emulsion, of an aqueous phase which contains therein from about 20 to about 80 weight %, based on the weight of said aqueous phase, of the polymer of claim 10; (b) from about 15 to about 50 weight %, based on the weight of the emulsion, of a hydrophobic liquid; and (c) from about 0.1 to about 5 weight %, based on the weight of the emulsion, of an oil-soluble surfactant.

* * * * *